July 5, 1966  J. W. WRIGHT ETAL  3,259,316
COMBINED FUEL CONTROL PRESSURE REGULATOR AND SWITCH
Filed March 13, 1963  2 Sheets-Sheet 1
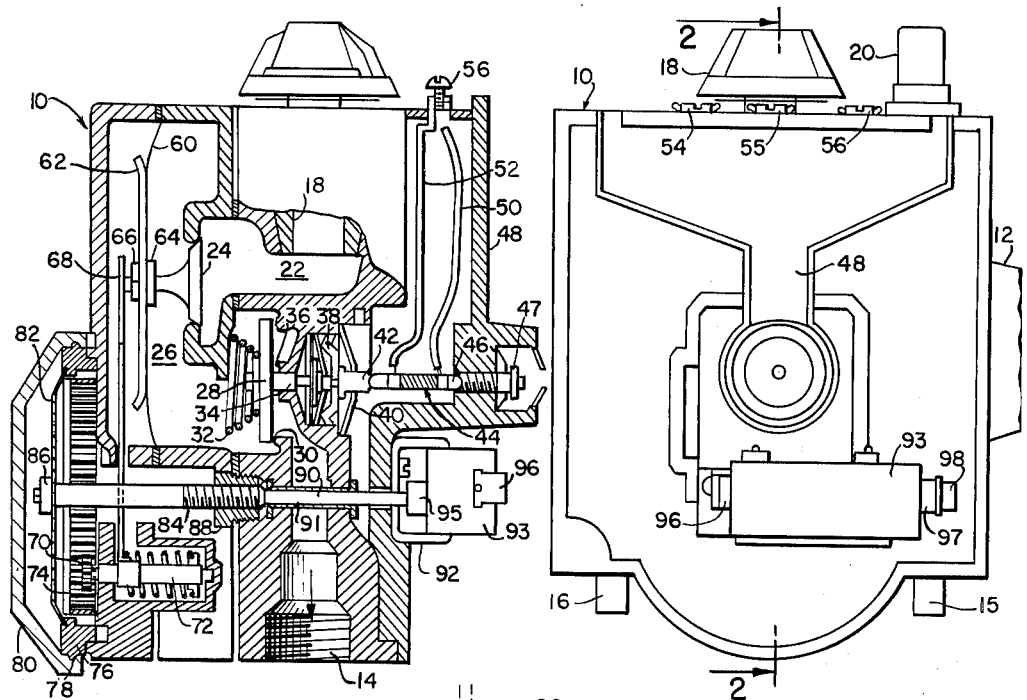
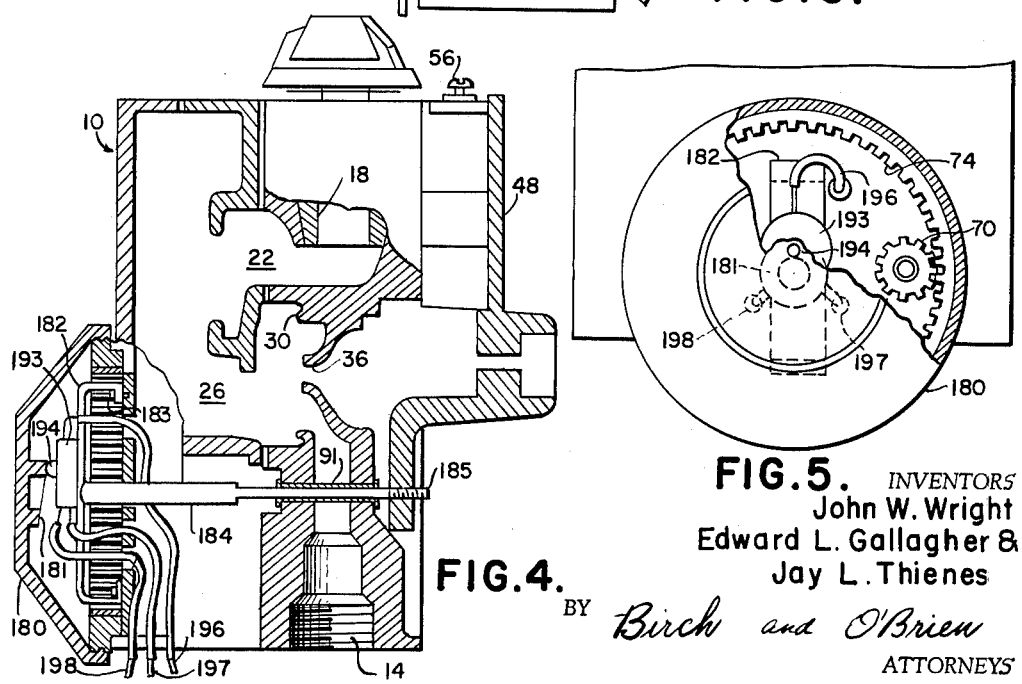
INVENTORS
John W. Wright
Edward L. Gallagher &
Jay L. Thienes
BY Birch and O'Brien
ATTORNEYS

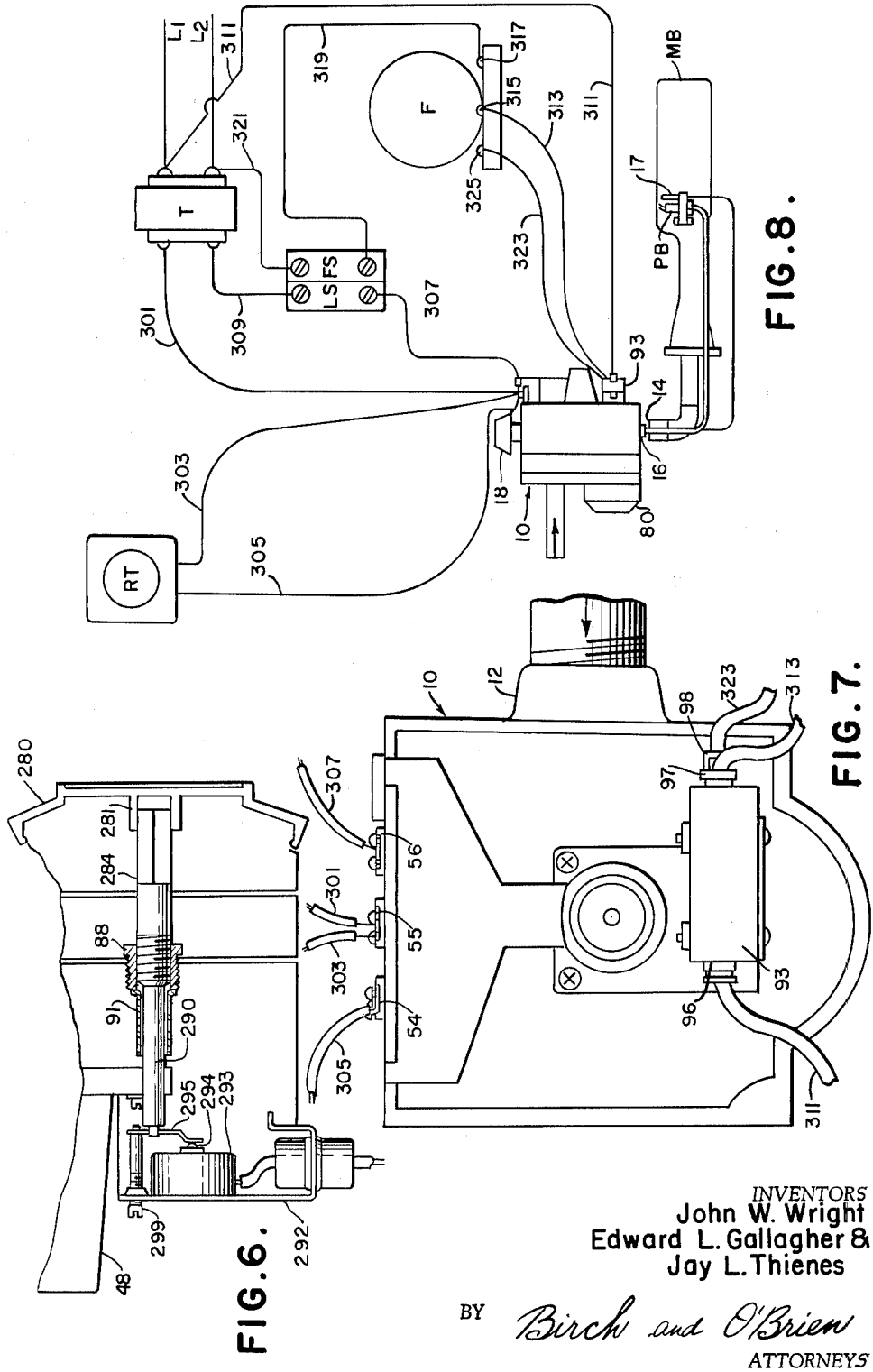

United States Patent Office 3,259,316
Patented July 5, 1966

3,259,316
COMBINED FUEL CONTROL PRESSURE REGULATOR AND SWITCH
John W. Wright, Long Beach, Edward L. Gallagher, La Mirada, and Jay L. Thienes, Artesia, Calif., assignors to Robertshaw Controls Company, Richmond, Va., a corporation of Delaware
Filed Mar. 13, 1963, Ser. No. 264,856
12 Claims. (Cl. 236—92)

This invention relates to control devices for heating systems and in particular to such devices for regulating the pressure of a fuel flow to a burner and controlling the operating speed of a circulating fan.

An object of this invention is to control the burner rate of a burner and the speed of a circulating fan by a single control device.

Another object of this invention is to utilize the single dial of a control device for setting a regulating valve and an electric switch.

Another object of this invention is to correlate the regulator setting and the fan speed switch of a control device.

This invention has another object in that the setting operation of a control device is axially movably relative to a manual dial.

It is another object of this invention to construct a pressure regulator control, a thermally responsive control and a circulation control into a simple compact unitary structure.

In practicing the present invention a control device body is provided with inlet and outlet openings for a fuel flow therethrough and thermostatically controlled valve means is operatively disposed in the casing for controlling the fuel flow between the inlet and outlet openings. Pressure regulating means is also disposed in the casing and is operative to regulate the pressure of the fuel flow. A switch mechanism carried by the casing is operated between positions by actuating means that simultaneously positions the pressure regulating means in a regulating position, and a manually operable dial, movably carried by the casing, is operatively connected to the actuating means.

Other objects and advantages will become apparent from the following description of the invention taken in connection with the accompanying drawings wherein:

FIGURE 1 is a rear view of a control device embodying the present invention;

FIGURE 2 is a section view taken on line 2—2 of FIGURE 1 with certain parts omitted;

FIGURE 3 is an elevation of a detail of FIGURE 2;

FIGURE 4 is a partial section view similar to FIGURE 1 showing a modification thereof;

FIGURE 5 is a partial front elevation of FIGURE 4 with the control dial patrially broken away;

FIGURE 6 is a partial section of a control device showing another modification;

FIGURE 7 is a rear view of a control device showing the electrical connections applicable to all the previous modifications; and FIGURE 8 is a schematic diagram of a heating control system embodying the present invention.

Referring first to FIGURES 1, 2 and 3 the present invention is embodied in a control device casing, indicated generally at 10, having an inlet port 12, a main outlet port 14 for supplying fuel to a main burner and a pilot outlet port 16 for supplying fuel to a pilot burner. A fuel passage (not shown) establishes communication between the inlet port 12 and a manually operable shut-off valve 18 which includes a control knob and a plug valve as is well-known in the art. The control knob is manually rotated between off, pilot and on positions in which the plug valve respectively closes off the inlet port 12, establishes communication between the inlet 12 and the fuel passage to the pilot outlet 16, and establishes the normal operating fuel flows. While in the on position, the valve 18 establishes a main flow of fuel as well as a pilot flow of fuel to the pilot outlet 16. In the event of pilot burner outage, a thermoelectric safety valve (not shown), positioned in the passageway between the inlet port 12 and the valve 18, shuts off the inlet port 12. A magnet reset button 20 for such a safety valve is shown protruding from the top of casing 10; thermoelectric safety of this type are well-known in the art and a detailed drawing and description of the holding magnet and valve structure are omitted for the sake of brevity.

Fuel from the shut-off valve 18 flows into a chamber 22 whence it is controlled by a regulating valve 24 to a second chamber 26. Control means in the form of an annular valve member 28 controls the flow from the second chamber 26 to the main outlet port 14 by cooperating with an annular valve seat 30 projecting inwardly from an internal rear wall portion of the casing 10. The valve member 28 is biased toward valve seat 30 by a coil spring 32 that is mounted in compression between valve member 28 and an oppositely disposed internal front wall portion of the casing 10.

The valve member 28 is secured to the end of a valve stem 34 which slidably projects through a bushing 36 formed in a rear wall portion of casing 10; the opposite end of stem 34 is operatively connected to a snap acting mechanism indicated generally at 38. The snap acting mechanism 38 includes a clicker disc that moves between positions through an overcenter position with a snap action in response to an applied operating force as is well-known in the art. A retainer and seal assembly 40 retains the snap acting mechanism 38 in an exterior counterbore formed in the rear wall portion of casing 10 and includes an operating button 42 for applying the operating force to the snap acting mechanism.

A thermal electric motor 44 has an expansible and contractible rod 46 suspended between the operating button 42 and an adjustable set screw 47 threaded through the wall of a rear cover plate 48. An electric heating coil is wound on the thermally responsive rod 46 and has lead wires 50 and 52 connected to terminal posts 54 and 56, respectively. As will be described more fully hereinafter, the heat motor 44 is operative to cause control of the main flow of fuel in response to a thermostatic device in the room or space being heated.

As is illustrated in FIGURE 2, one wall of the chamber 26 is defined by a diaphragm assembly including a flexible diaphragm 60 sealed at its periphery to adjacent sections of casing 10 and carrying a stiffening plate 62 inwardly of its periphery. The stem of valve 24 extends through the center of the stiffening plate 62 and diaphragm 60 and is secured thereto by suitable fastening means such as oppositely disposed threaded nuts 64 and 66 threaded onto such valve stem. The diaphragm assembly and the valve 24 are moved to an open position by means of a lever actuating element 68 in the form of a resilient strip which engages the free end of the stem of valve 24. Thus, the valve member 24 is selectively positioned to a predetermined regulator setting which may be selectively varied to vary the rate of the main fuel flow to the chamber 26.

A manually adjustable mechanism for varying the regulator setting includes a pinion gear 70 operatively connected to a coil spring and plunger assembly 72 which engages the lower end of the lever actuator 68; rotation of the gear 70 adjusts the biasing force exerted by the regulating spring assembly 72 to vary the setting of diaphragm 60 and its value 24. The pinion gear 70 is rotatably carried on the front section of the casing 10 and is in meshing engagement with the internal teeth of a ring gear 74 which is also rotatably carried on the front section of the casing 10. Annular projection means 76 on the exterior of the ring gear 74 cooperate with recess means 78 on the interior of a rotatable dial 80; the projection and recess means define a snap fit for integrally connecting the dial 80 and ring gear 74. The dial 80 and an adjacent part of the casing 10 are provided with suitable indicia (not shown) whereby the dial setting will indicate the selected regulator setting.

A centrally apertured, flexible element or disc 82 is secured to the ring gear 74 for rotation therewith. An adjusting shaft 84 extends through the aperture center of the flexible element 82 and is fixed in position against a shoulder thereon by a fastener such as nut 86 which permits correlation of the positions of shaft 84 and dial 80 for calibration purposes. The inner end of shaft 84 is threaded through a bushing 88, that is threaded into the casing 10, and engages one end of an actuating shaft 90. A sleeve 91 extends through casing 10 and across the outlet passage 14; a press fit for the sleeve 91 in the wall portions of casing 10 provides a gas seal for the sleeve. The actuating shaft 90 slidably extends through the sleeve 91 and through the rear cover plate 48 for actuating a switch mechanism.

The switch mechanism comprises a U-shaped mounting bracket 92 secured to the exterior of cover plate 48 and providing a support for a single pole, double throw switch 93. A switch actuating plunger 94 protrudes through the switch housing and is engaged by a flexible amplifying lever 95 that has an end portion pivotally carried by the switch casing. The amplifying lever 95 is biased against the end of the shaft 90 for actuation in response to shaft movement. The switch mechanism may be of any conventional construction of snap acting switches and has a common terminal post 96, a high speed fan terminal post 97 and a low speed fan terminal post 98.

In describing the modification shown in FIGURES 4 and 5, the same reference numerals have been used for parts that are identical to the parts of FIGURES 1, 2 and 3 so that repetitious description may be omitted. Reference numerals in the 100 series have been used in FIGURES 4 and 5 to identify those parts which differ from the previous modification. In this instance the flexible element 182 comprises a flat strip having bent leg portions for securing the same to the front wall portion of the casing 10 as by screws 183. A single pole, double throw switch 193 is carried by the flexible strip 182 with its actuating plunger button 194 extending away from the casing 10 and being offset from the axis of the ring gear 74 and from the axis of the dial 180 and a cam 181 which defines a circular cam area fixed on the inside of the dial 180 to engage the switch button 194. The flexible element 182 (and the switch 193 thereon) is normally biased away from the cam surface 181 and into engagement with the end of a control shaft 184 which extends through the wall portions of the casing 10 including the gas sealing sleeve 91. Adjacent its exposed end the control shaft is threaded to form an adjusting screw 185 received in a similarly threaded bore in the rear cover plate 48. Manual rotation of the dial 180 and the cam 181 causes switch button 194 to move axially and thereby, in cooperation with shaft 184, actuating switch 193 to a fan speed controlling position.

In the following description of the modification of FIGURE 6 reference numerals in the 200 series have been utilized to identify those parts which are different from the previous modifications. In this instance the inner surface of the dial 280 has a recessed boss 281 shaped to form slidable, no-rotatable connection with the end of a control shaft 284 having a similar shape such as square, hexagonal, etc. Such an arrangement permits slidable axial movement of the control shaft 284 in response to rotation of the dial 280. Rotation of the control shaft 284 in the fixed bushing 88 effects axial movement of the actuating shaft 290 for actuating a switch mechanism.

The switch mechanism of FIGURE 6 comprises a mounting bracket 292 secured to the rear cover plate 48 and providing a support for a single pole, double throw switch 293. A switch actuating plunger 294 protrudes through the switch housing and is engaged by a lever 295 that has an end portion pivotally connected to an adjustable fulcrum screw 299. Intermediate its ends the lever 295 is operatively associated with the exposed end of the shaft 290 for actuation in response to shaft movement.

The electrical circuitry and heating system components in FIGURE 7 and the electrical connections in FIGURE 8 will be described in conjunction with the following description of the sequence of operations. Assuming that the heating control system is being utilized in a central, forced air heating system having a gas furnace, a space or room thermostat is suitably positioned on a wall sensing the room temperature, and a fan and limit control is located in the furnace duct. The room thermostat RT is connected across the secondary winding of a transformer T and is in series with the over-temperature limit switch LS and the heat motor terminals 54 and 56.

Referring now to FIGURE 2, it is assumed that the plug valve 18 has been manually rotated to its on position and that the pilot burner PB has been ignited whereby the electromagnetic safety valve is held in its open position by the voltage generated at the thermoelectric generator 17 which has leads connected to the thermocouple tap 15 on the casing 10. Rotation of the regulator setting dial 80 to a regulator setting in the range of a high input causes the actuator lever 68 to position the diaphragm controlled valve 24 in an open position. Rotation of the dial 80 simultaneously causes the rotation of shaft 84 in the fixed nut 88 whereby the actuating shaft 90 is moved axially relative to the sleeve 91; the axial movement of the shaft 90 causes the switch 93 to close a circuit between its common terminal post 96 and its high speed terminal post 97. In this manner, the single pole, double throw switch 93 is simultaneously actuated by the rotation of the dial 80 so that a predetermined and calibrated higher input setting is automatically accompanied with an energizing circuit for the high speed winding of the two speed fan motor F. Conversely, the switch 93 returns the fan motor F to a lower speed when the dial 80 is set for inputs below the predetermined changeover point.

Upon heat demand, the room thermostat RT closes its switch and an electric circuit for the heat motor 44 may be traced as follows: from the secondary of the transformer T, which is connected across the lead lines $L_1$ and $L_2$, through the conductor 301, the terminal 55, the conductor 303, the room thermostat RT, the conductor 305, the terminal 54, the lead wire 50, the coil of the heat motor 44, the lead wire 52, the terminal 56, the conductor 307, the limit switch LS, and the conductor 309 back to the secondary of the transformer T. Energization of the heat motor 44 actuates the snap acting mechanism 38 which moves the valve 28 to an open position permitting flow of fuel to the main outlet 14 whence it proceeds to the main burner MB for ignition by the pilot burner PB.

When the dial 80 is rotated to one of its high input regulator settings, an electric circuit for the high speed winding of the fan F may be traced as follows: from the line $L_1$, through the conductor 311, the common terminal post 96, the high speed fan terminal post 97, the conductor 313, the high speed winding terminal 315 of the fan, the common fan terminal 317, the conductor 319, the fan switch FS, and the conductor 321 back to the lead line $L_2$. Whenever the dial 80 is rotated to one of its low input regulator settings, the switch 93 transfers to the low speed winding of the fan through the conductor 323 and the low speed winding terminal 325.

During the dial setting operation of the modification shown in FIGURE 2, the flexible element 82 will flex as the shaft 84 moves axially in the fixed nut 88 because the flexible element 82 is keyed to the shaft 84. Thus, the flexible element 82 forms a driving connection for the shaft 84 and constitutes a locking means therefor by placing its threads under tension to prevent accidental or vibrational movement of the shaft in the fixed nut 88. The flexible element 182 in FIGURE 4 similarly places the threads for the screw end 185 of control shaft 184 under tension and the adjusting screw end 185 may be adjusted to correlate the position of the shaft 184 and the dial 180 for calibration purposes. In FIGURE 6 the lever 295 constitutes the flexible element which biases the actuating shaft 290 into abutting engagement with the end of the conrol shaft 284 whereby the threads in the fixed nut 88 are placed under tension. The snap mechanism of the switch 293 exerts an outward force (to the right as viewed in FIGURE 6) on its actuating button 294 which in turn normally biases the lever 295 into engagement with the end of shaft 290. The opposite end of lever 295 is fulcrummed on the end of adjustment screw 299 which may be adjusted in a manner similar to adjustment screw 185 in order to provide correlation or timing between dial rotation and the switch-over point from low to high speeds. During rotation of dial 280 the noncircular end of the control shaft 284 will slide axially in the similar non-circular recessed boss 281 to provide relative axial movement between the dial 280 and the control shaft 284.

When the heat demand is satisfied, the room thermostat RT will open its switch contacts and thus deenergize the heat motor 44 causing the fuel flow to the main burner MB to be cut off. Thus the thermostatic cycling of the room thermostat RT now controls the heating system, however, the safety features of the heating control system may independently cause shut down of the main burner, namely (1) extinguishment of the flame at pilot burner PB which results in closure of the electromagnet valve, and (2) excessive temperatures in the heating duct which opens the limit switch LS to deenergize the heat motor 44. During normal operation, the fan switch FS provides a fan delay to permit warming of the heating duct before circulation and to permit continued circulation after closure of main valve 28 for dissipation of the warm air in the heating duct.

Inasmuch as many changes in structural details could be made in the above constructions and inasmuch as the present invention is subject to many more widely different embodiments, it is intended that all matter contained in the foregoing description or shown in the accompanying drawings shall be interpreted as illustrative and not in a limiting sense.

What is claimed is:

1. In a control device, the combination comprising a casing having inlet and outlet openings, valve means in said casing for controlling a fuel flow between said inlet and outlet openings, pressure regulating means in said casing for regulating the fuel flow therethrough, means biasing said pressure regulating means and moving the same between high and low settings, switch means carried by said casing and being movable between high and low control positions, a dial on said casing movable between a plurality of positions, and means operatively connected to said dial for simultaneously causing said biasing means to move said pressure regulating means between its high and low settings and moving said switch means to correlated positions.

2. The combination as recited in claim 1, wherein said operatively connected means includes a control shaft and flexible means for biasing said control shaft in an axial direction.

3. In control apparatus for heating systems having a fuel burner and a circulating fan, the combination comprising a casing having inlet and outlet openings, thermostatically controlled valve means in said casing for controlling a fuel flow between said inlet and outlet openings, pressure regulating means in said casing for regulating the fuel flow therethrough, adjustable biasing means operatively connected to said pressure regulating means for moving the same between high and low settings, fan switch means operatively associated with said casing and being movable between a plurality of switching positions corresponding to the high and low settings of the pressure regulating means, shaft means operatively associated with said pressure regulating means and said fan switch means, said shaft means including a portion threaded into said casing, flexible means biasing said shaft means to prevent accidental unthreading of said threaded portion, and a dial element operative for simultaneously adjusting said adjustable biasing means and positioning said fan switch means in correlated high and low settings.

4. The combination as recited in claim 3, wherein said flexible means comprises a flexible element having a peripheral portion secured to said dial element and a central portion keyed to said shaft means.

5. The combination as recited in claim 3, wherein said flexible means comprises a flexible element having a peripheral portion secured to said casing and a central portion abutting said shaft means.

6. The combination as recited in claim 5, said switch means is carried by said flexible element and cam means are operatively disposed between said dial element and said switch means for actuating the same.

7. The combination as recited in claim 3, wherein said flexible means includes a lever disposed between said switch means and one end of said shaft means, said dial element includes a recessed boss, and the other end of said shaft means is connected to said recessed boss with a non-rotatable, slidable connection.

8. In a control device for a heating system having a fuel burner and a circulation fan, the combination comprising a casing having an inlet adapted to receive fuel from a fuel source and an outlet adapted to deliver fuel to the burner, valve means in said casing for controlling a fuel flow therethrough and being adapted to respond to temperature variations in a space being heated, pressure regulating valve means in said casing for regulating the fuel flow therethrough, adjustable biasing means operatively connected to said pressure regulating valve means for moving the same between a plurality of settings for delivering the fuel flow at high and low inputs to the fuel burner, switch means movable between a plurality of settings for operating the circulation fan at high and low speeds, a dial on said casing movable between a plurality of positions corresponding to high and low fuel burner input settings, a control shaft carried by said casing and being operatively connected to said adjustable biasing means and said switch means, and an operative connection between said dial and said control shaft whereby rotation of said dial effects simultaneous adjustment of said adjustable biasing means and positioning of said switch means to corresponding high and low input settings.

9. The combination as recited in claim 8, wherein said control shaft includes a portion threaded into said casing, and flexible means biases said control shaft to place the threaded portion under tension.

10. The combination as recited in claim 9, wherein said flexible means comprises a flexible element carried by said dial, and said operative connection includes an adjustably keyed connection between said flexible element and said control shaft.

11. The combination as recited in claim 9, wherein said flexible means comprises a flexible element having its periphery secured to said casing, said operative connection includes an end portion of said control shaft abutting said flexible element, said switch means is carried by said flexible element, and cam means are disposed on said dial for operating said switch means.

12. The combination as recited in claim 9, wherein said flexible means is disposed between said switch means and one end of said control shaft, and said operative connection includes a recessed boss on said dial and a similarly shaped portion on the other end of said control shaft to effect unitary rotation and relative axial movement between said dial and said control shaft.

References Cited by the Examiner

UNITED STATES PATENTS

| | | | |
|---|---|---|---|
| 792,258 | 6/1905 | Grinnell | 200—61.86 |
| 1,127,232 | 2/1915 | Grimes | 200—61.86 |
| 1,870,895 | 8/1932 | Carson | 236—99 |
| 2,134,257 | 10/1938 | Leutwiler et al. | |
| 2,402,177 | 6/1946 | Miller | 236—11 X |
| 2,784,913 | 3/1957 | Wasson | 236—92 |
| 3,020,921 | 2/1962 | Currie et al. | 236—92 X |
| 3,109,449 | 11/1963 | Flagg. | |

ALDEN D. STEWART, *Primary Examiner.*